April 14, 1925.
F. C. SCHLACK
1,533,518
AUTOTRUCK
Filed May 10, 1924
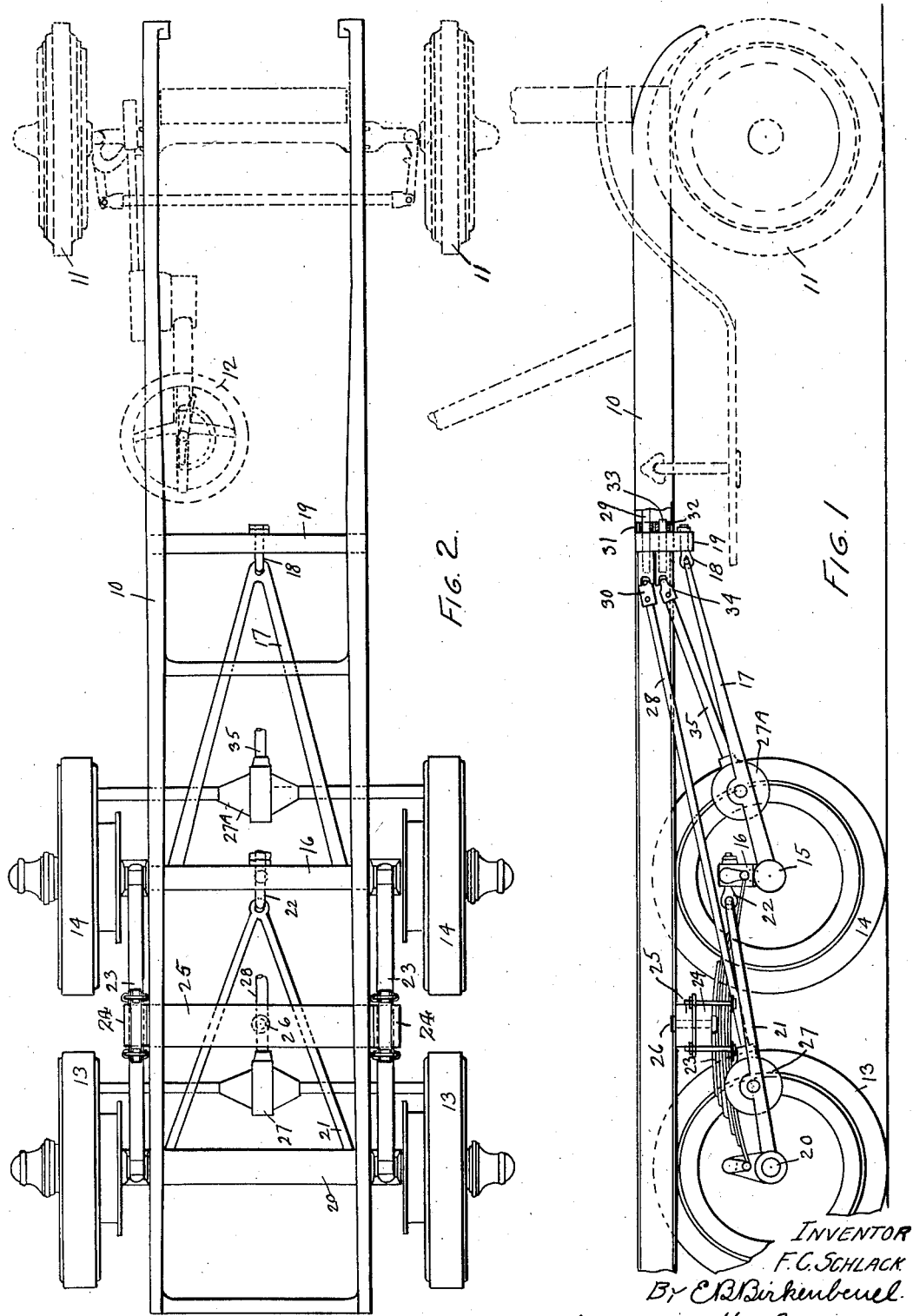

Patented Apr. 14, 1925.

1,533,518

UNITED STATES PATENT OFFICE.

FRED C. SCHLACK, OF LAUREL, OREGON.

AUTOTRUCK.

Application filed May 10, 1924. Serial No. 712,422.

*To all whom it may concern:*

Be it hereby known that I, FRED C. SCHLACK, a citizen of the United States, and resident of Laurel, county of Washington, State of Oregon, have invented a new and useful Autotruck, of which the following is a specification.

This invention relates more particularly to self propelled vehicles.

The object of my invention is to provide an exceedingly simple and efficient means for distributing a motor vehicle load over a large area of roadway, and to minimize the road shocks usually produced by the rear wheels dropping into ruts or rising over obstacles.

I accomplish these results in the manner set forth in the following specification and illustrated in the accompanying drawing, in which:

Figure 1 is a side elevation of a vehicle equipped with my device showing only the necessary parts. Figure 2 is a plan of Fig. 1, also showing only the parts intimately connected with the working of my device. Fine details have been omitted for the purpose of better illustrating the device.

Similar numbers of reference refer to the same or similar parts throughout the views.

Referring in detail to the drawing, I have constructed my device of the usual frame member 10 supported by the front wheels 11 which are controlled by the steering wheel 12. Under the rearward end of the truck 10 I have placed two sets of driving wheels 13 and 14. The forward set 14 is provided with an axle 15 upon which is pivoted a bolster 16. A V-shaped tongue 17 attaches the axle 15 to an eye bolt 18 in the cross bar 19 of the frame 10.

The rear wheels 13 are provided with an axle 20 which is joined by means of the V-shaped reach 21 to the bolster 16 by means of the eye bolt 22. Suspended between the ends of the axle 20 and the bolster 16 are the springs 23 upon which is secured a bunk 24. On the bunk 24 is pivoted a bolster 25 by means of the pin 26. The frame 10 is secured to the bolster 25. Each pair of wheels 13 and 14 is driven by the separate differentials 27 and 27$^A$ by means of internal gears, as is common in the art. The shaft 28 from the differential 27 is connected with the main driving shaft 29 by means of the universal joint 30. A spur gear 31 on the shaft 29 drives a similar gear 32 on the counter shaft 33 which, through the universal joint 34 and the shaft 35, drives the differential 27$^A$. The braking means is not illustrated but can be patterned after any of the systems now in use and does not form a part of my invention.

The operation of my device is as follows: If the steering wheel 12 is operated to turn the forward end of the truck to the right it follows that the rear end of the truck, which is pivotally mounted on the pin 26, will turn and the bar 19 will pull the tongue 17 of the wheels 14 a proportionate distance and cause them to travel to the right. Such action on their part will also cause the reach 21 to be pulled to the right and cause the rearmost wheels to also angle to the right.

It will be understood that by this arrangement one can back or travel forwardly in precisely the same manner as he would with the ordinary manipulation of a truck or wagon, and that the inequalities of the road are divided between the wheels 13 and 14, as well as securing a more uniform distribution of the load upon the roadway.

It will be understood that in the production of my device it will operate equally well if its frame is underslung, and that its minor details may be varied to meet the requirements, without departing from the spirit of my invention.

I am aware that numerous devices have been constructed for accomplishing the same purpose as performed by my device. I therefore do not claim same broadly but only within the limits set forth in the following claims.

What I claim as new is:

1. A vehicle having a frame and two front steering wheels in combination with two pairs of rear load-carrying driving wheels, the forward pair of said driving wheels having a tongue hinged forwardly to the truck frame and a bolster pivoted over their axle, the rearward wheels having a reach joining their axle to the bolster of said forward pair of drive wheels, two springs suspended between the ends of said rear axle and bolster, a bunk across said springs, and a bolster pivoted on said bunk and supporting said frame.

2. In an automobile truck having a frame and front wheels in combination with four drive wheels under its rearward end, the forward pair of said drive wheels carrying a pivoted bolster and having its axle joined by a tongue to said truck frame and having its rear axle joined by a reach to said front bolster, springs suspended between said rear axle and said front bolster, a bunk across said springs, a middle bolster pivoted over said bunk and secured to said truck frame, a separate differential for each of the two pairs of drive wheels, and means for driving both differentials from the main drive shaft.

FRED C. SCHLACK.